(12) United States Patent
Higuchi et al.

(10) Patent No.: US 11,577,713 B2
(45) Date of Patent: Feb. 14, 2023

(54) METHOD AND DEVICE FOR CONTROLLING HYBRID VEHICLE

(71) Applicant: Nissan Motor Co., Ltd., Yokohama (JP)

(72) Inventors: Shinsuke Higuchi, Kanagawa (JP); Hidekatsu Akiyama, Kanagawa (JP); Azusa Kobayashi, Kanagawa (JP); Keisuke Kawai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/771,974

(22) PCT Filed: Dec. 15, 2017

(86) PCT No.: PCT/JP2017/045220
§ 371 (c)(1),
(2) Date: Jun. 11, 2020

(87) PCT Pub. No.: WO2019/116586
PCT Pub. Date: Jun. 20, 2019

(65) Prior Publication Data
US 2021/0155218 A1    May 27, 2021

(51) Int. Cl.
*B60W 10/08*    (2006.01)
*B60L 58/13*    (2019.01)
(Continued)

(52) U.S. Cl.
CPC ............ *B60W 10/08* (2013.01); *B60L 58/13* (2019.02); *B60W 10/06* (2013.01); *B60W 10/26* (2013.01)

(58) Field of Classification Search
CPC ...... B60W 10/08; B60W 10/06; B60W 10/26; B60W 2710/244; B60W 2510/246;
(Continued)

(56) References Cited

U.S. PATENT DOCUMENTS

2011/0000725 A1    1/2011  Murota et al.
2012/0283903 A1*  11/2012  Kusumi ................. B60L 58/10
                                                                     701/22

(Continued)

FOREIGN PATENT DOCUMENTS

EP          2502775 A1    9/2012
JP       2011121406 A     6/2011
(Continued)

*Primary Examiner* — Yi-Kai Wang
(74) *Attorney, Agent, or Firm* — Young Basile Hanlon & MacFarlane, P.C.

(57) ABSTRACT

A method for controlling a hybrid vehicle including a battery charged with electric power generated by an engine, including a motor as a drive source, and having multiple running modes that can be selected through a mode operation, the running modes including a normal mode configured to perform charging of the battery according to a running state, and a charge mode configured to perform electric power generation by the engine according to a mode operation, the method comprising: setting a range of charge amount that allows for charging of the battery based on the electric power generated; and setting an upper limit of the range of charge amount in the charge mode to be lower than an upper limit of the range of charge amount in the normal mode.

9 Claims, 3 Drawing Sheets

(51) Int. Cl.
*B60W 10/06* (2006.01)
*B60W 10/26* (2006.01)

(58) Field of Classification Search
CPC ......... B60W 2510/244; B60W 50/082; B60W 20/14; B60W 2540/215; B60W 20/13; B60W 30/182; B60W 40/105; B60W 2720/10; B60W 20/00; B60L 58/13; B60L 50/61; B60L 7/14; B60L 3/0046; B60L 2260/40; B60L 2260/20; Y02T 10/70; Y02T 10/62; B60K 6/46; F02D 29/06; B60Y 2200/92
USPC .......................................................... 701/22
See application file for complete search history.

(56) References Cited

U.S. PATENT DOCUMENTS

| | | | |
|---|---|---|---|
| 2015/0232100 A1* | 8/2015 | Yamamoto | B60W 30/18118 477/92 |
| 2018/0154778 A1* | 6/2018 | Ota | H02J 7/0068 |
| 2019/0152466 A1* | 5/2019 | Suzuki | B60K 6/485 |
| 2020/0384978 A1* | 12/2020 | Abe | B60K 17/02 |

FOREIGN PATENT DOCUMENTS

| | | | |
|---|---|---|---|
| JP | 2016-159859 A | | 9/2016 |
| KR | 20120045278 A | * | 5/2012 |
| KR | 20120045278 A | | 5/2012 |

\* cited by examiner

METHOD AND DEVICE FOR CONTROLLING HYBRID VEHICLE

TECHNICAL FIELD

The present invention relates to a method and a device for controlling a hybrid vehicle.

BACKGROUND ART

There is conventionally known a series hybrid electric vehicle that includes: an electric generator driven by an engine loaded onto the vehicle; a battery charged by the electric generator; and a motor that produces a driving force with electric power supplied from the battery. A series hybrid electric vehicle disclosed in JP2016-159859A performs power generation control that causes an electric generator to be driven by an engine when the battery charge level becomes a predetermined rate or lower.

SUMMARY OF INVENTION

Here, for example, in a case where a driver wants a vehicle running silently (a vehicle running in silent mode) by means of driving of a motor, it is desirable to keep an amount of battery charge at a high level in advance. However, the above-described series hybrid electric vehicle does not perform power generation control unless the battery charge level becomes the predetermined rate or lower, and therefore cannot actively control the amount of battery charge to high level according to driver's demand.

Meanwhile, to control the amount of battery charge to high level according to the driver's demand, it is necessary to actively drive the electric generator according to the demand. However, for example, when the amount of battery charge becomes a predetermined rate or higher, such as in a case where the amount of battery charge reaches full charge level, power generation may be restricted.

Then, even though the driver wants to increase the amount of charge to cause the vehicle to run in silent mode, the power generation restriction may result in a shortage of the amount of charge, and the vehicle cannot continue running in silent mode despite the driver's demand.

The present invention is intended to provide a technology to avoid power generation being restricted due to the amount of battery charge while increasing the amount of battery charge according to a driver's demand for battery charging by properly controlling an amount of battery charge.

According to an aspect of this invention, a method for controlling a hybrid vehicle including a battery charged with electric power generated by an engine, including a motor as a drive source, and having multiple running modes that can be selected through a mode operation, the running modes including a normal mode configured to perform charging of the battery according to a running state, and a charge mode configured to perform electric power generation by the engine according to a mode operation, the method comprising: setting a range of charge amount that allows for charging of the battery based on the electric power generated; and setting an upper limit of the range of charge amount in the charge mode to be lower than an upper limit of the range of charge amount in the normal mode.

Embodiments of the present invention is described in detail below with reference to the accompanying drawings.

DESCRIPTION OF EMBODIMENTS

Embodiment

An embodiment of a series hybrid electric vehicle to which a device for controlling a hybrid vehicle according to the present invention is applied is described below.

Figure 1:
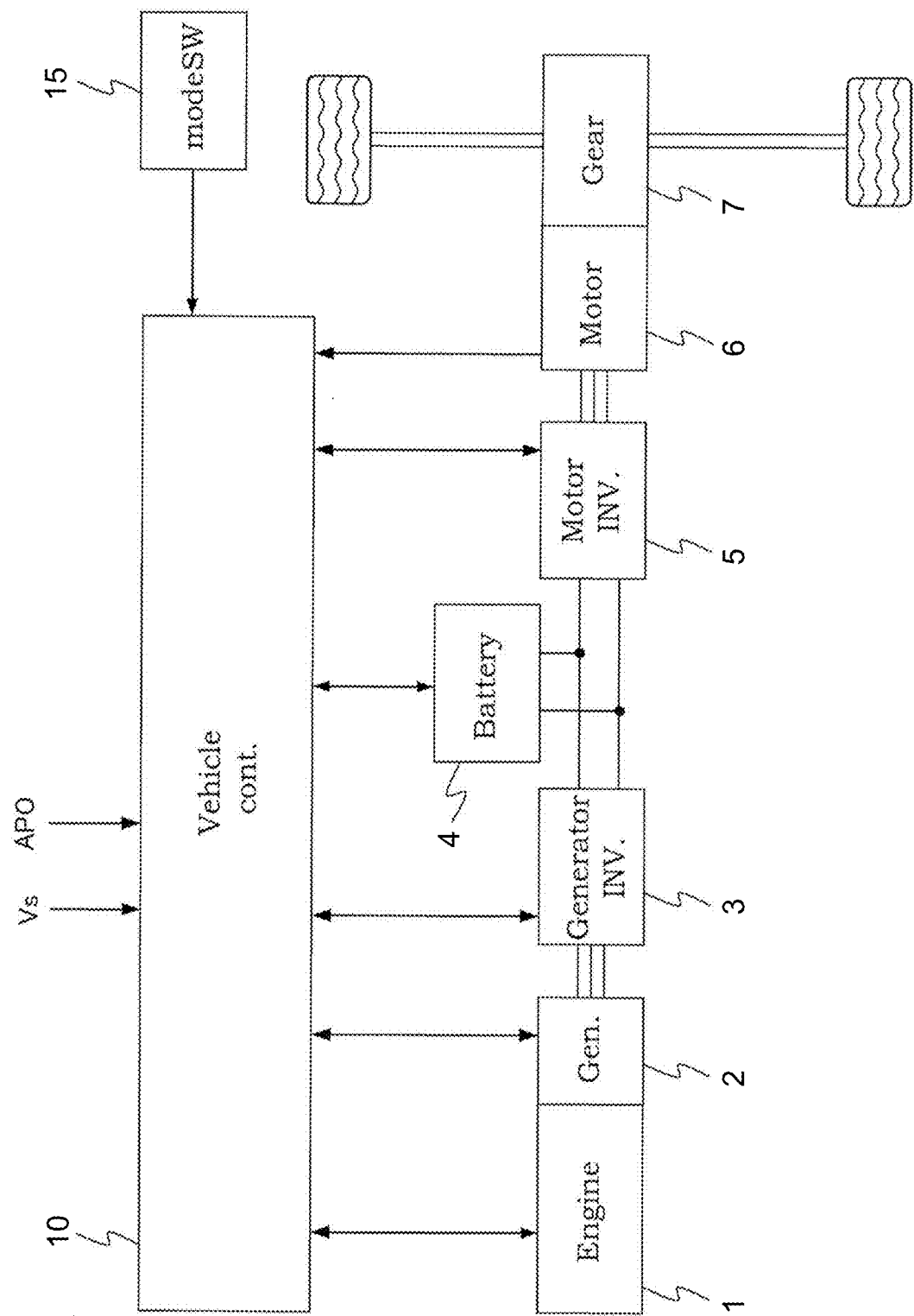
FIG. 1 is a schematic configuration diagram of a series hybrid vehicle to which a device for controlling a hybrid vehicle according to an embodiment is applied.

FIG. 1 is a block diagram showing a system configuration of the series hybrid vehicle to which the device for controlling the hybrid vehicle according to the embodiment is applied. FIG. 1 shows the series hybrid vehicle equipped with a motor for electric power generation (hereinafter, referred to as an electric generator 2) and a motor for driving (hereinafter, referred to as a drive motor 6).

The series hybrid vehicle (hereinafter, referred to simply as the vehicle) according to the present embodiment includes an engine 1, the electric generator 2, a generator inverter 3, a battery 4, a drive inverter 5, the drive motor 6, a reduction gear 7, a vehicle controller 10, and a mode SW 15.

The engine (internal-combustion engine) 1 is connected to the electric generator 2 through a gear (not shown), and transmits power for the electric generator 2 to generate electric power to the electric generator 2. It is to be noted that the vehicle to which the device for controlling the hybrid vehicle according to the present embodiment is applied is a series system, and thus the engine 1 is mainly used as a drive source for driving the electric generator 2 to rotate.

The electric generator 2 is rotated by the power from the engine 1, thereby generating electric power. That is, a driving force of the engine 1 is transmitted to the electric generator 2, and the electric generator 2 generates electric power with the driving force of the engine 1. Furthermore, at the start of the engine 1, the electric generator 2 also performs motoring in which the engine 1 is caused to crank up by using power of the electric generator 2 and the engine 1 is powered to run and rotate by using power of the electric generator 2, and thereby electric power is consumed.

The generator inverter 3 is connected to the electric generator 2, the battery 4, and the drive inverter 5, and converts alternating-current power generated by the electric generator 2 into direct-current power and supplies the direct-current power to the battery 4. That is, electric power generated by the electric generator 2 is charged into the battery 4. Furthermore, the generator inverter 3 converts direct-current power supplied from the battery 4 into alternating-current power, and supplies the alternating-current power to the electric generator 2.

The battery 4 is charged with electric power generated by the electric generator 2 and regenerative electric power of the drive motor 6, and also discharges drive power for driving the electric generator 2 and the drive motor 6. The battery 4 in the present embodiment includes a lithium-ion battery. The charge level of the battery 4 is represented by a state of charge (SOC). The SOC here represents the percentage of an amount of charge (remaining charge capacity) of the battery 4 in an amount of charge of the battery 4 when fully charged, and its value ranges between 0 and 100 [%] according to the amount of charge of the battery 4.

Energy management of the battery 4 and the entire vehicle is performed by the vehicle controller 10. The vehicle controller 10 calculates charging/discharging electric power of the battery 4 and electric power supplied to the drive motor 6 according to a driver's demand, and controls the SOC of the battery 4 so as to be maintained within a predetermined range.

The drive inverter 5 converts direct-current power supplied from the battery 4 or the generator inverter 3 into alternating-current power, and supplies the alternating-current power to the drive motor 6. Furthermore, the drive inverter 5 converts alternating-current power regenerated by the drive motor 6 into direct-current power, and supplies the direct-current power to the battery 4.

The drive motor 6 produces a driving force with an alternating current supplied from the drive inverter 5, and transmits the driving force to a driving wheel through the reduction gear 7. Furthermore, the drive motor 6 produces a regenerative driving force when rotated along with the driving wheel, for example, when the vehicle is decelerated or while the vehicle is coasting, thereby collecting kinetic energy of the vehicle as electric energy. The collected electric energy is charged, as regenerative electric power, into the battery 4.

The vehicle controller 10 includes, for example, a central processing unit (CPU), a read-only memory (ROM), a random access memory (RAM), and an input/output (I/O) interface. The vehicle controller 10 calculates a motor torque command value to the drive motor 6 according to information on a vehicle state, such as accelerator position (accelerator opening degree), vehicle speed, and road surface gradient.

Furthermore, the vehicle controller 10 acts as a battery charge amount detecting unit that detects or estimates an amount of battery charge. The battery charge amount detecting unit measures an SOC of the battery 4 on the basis of a current and a voltage that are charged into or discharged from the battery 4.

Moreover, the vehicle controller 10 acts as an electric power generation control unit that controls electric power generation by the engine according to a running state, etc. The electric power generation control unit calculates inputtable electric power and outputtable electric power of the battery 4 according to, for example, the temperature, the internal resistance, and the SOC of the battery 4, and acquires the calculated values as basic information on chargeable and dischargeable electric power of the battery 4. Then, the electric power generation control unit calculates a target SOC of the battery 4 on the basis of a mode selected by the mode SW 15 to be described later and information such as SOC information of the battery 4, inputtable electric power and outputtable electric power of the battery 4, and an amount of regenerative electric power of the drive motor 6, and controls the amount of electric power generated by the electric generator 2 to achieve the calculated target SOC.

More specifically, to adjust the amount of charging electric power of the battery 4 based on electric power from the electric generator 2, the electric power generation control unit controls the engine 1, the electric generator 2, the generator inverter 3, and the battery 4. For example, the vehicle controller 10 controls the engine 1 so as to achieve a target amount of electric power generation of the electric generator 2, and adjusts an intake air amount of a throttle actuator, a fuel injection amount of an injector, and ignition timing of a spark plug according to a state signal representing the rotation speed, the temperature, etc. of the engine 1. A specific method to control the SOC of the battery 4 will be described later.

Furthermore, the vehicle controller 10 performs switching control on the drive inverter 5 according to a state such as the rotation speed and the voltage of the drive motor 6 so that the drive motor 6 achieves intended driving torque.

It is to be noted that all the above-described functions of the vehicle controller 10 do not have to be configured to be performed by the vehicle controller 10 alone as in the present embodiment. For example, an engine controller that controls the engine 1 may be provided separately so that multiple controllers perform the functions in a coordinated manner.

The mode selection switch (mode SW) 15 is a switch for mode selection (switching) provided to allow a driver or an occupant to alternatively select from multiple running modes. The running modes that can be selected by the mode SW 15 include at least normal mode, silent mode, and charge mode. In the following, differences in charging/discharging of the battery 4 among the modes are mainly described.

Normal mode is a mode at the time of normal running, and is a mode configured to control charging/discharging of the battery 4 according to the running state. The running state here is, for example, the SOC of the battery 4. In normal mode, for example, when the SOC becomes a value equal to or lower than a certain predetermined value, the vehicle controller 10 causes the electric generator 2 to be driven by the engine 1 to charge the battery 4.

Figure 2A:
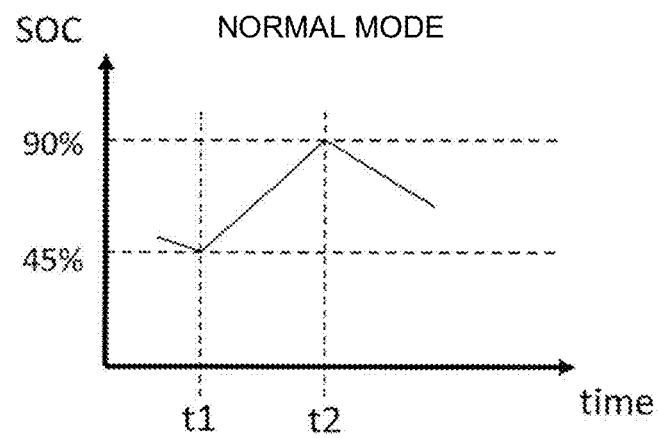
FIG. 2A is a diagram to explain an SOC range in normal mode.

FIG. 2A is a diagram to explain control of the amount of charge of the battery 4 (SOC control) in normal mode. The horizontal axis indicates time, and the vertical axis indicates the SOC [%] of the battery 4. A solid line in the diagram represents the SOC of the battery 4.

At time t1, the vehicle controller 10 detects that the SOC of the battery 4 is a rate equal to or lower than a predetermined rate, and starts electric power generation by the engine 1. The predetermined rate of the SOC for comparison here is hereinafter referred to as a "normal power generation start threshold". The normal power generation start threshold in the present embodiment is, for example, 45%.

At time t2, the vehicle controller 10 detects that the SOC of the battery 4 has reached a predetermined rate, and shuts down the electric power generation by the engine 1. The predetermined rate of the SOC for comparison here is hereinafter referred to as a "normal power generation restriction threshold". In terms of the protection of the battery, the "normal power generation restriction threshold" is properly set to prevent the battery 4 from going into an overcharge state; for example, a value that can avoid lithium ions being precipitated inside the battery 4 is set. The normal power generation restriction threshold in the present embodiment is, for example, 90%. Therefore, to protect the battery 4, when the SOC of the battery 4 exceeds 90%, driving of the engine 1 for the purpose of generating electric power is restricted, and charging of the battery 4 is prohibited for a given period of time. A stage in which charging of the battery 4 is suspended in this way is hereinafter referred to as a "charging prohibition stage".

An area between the "normal power generation start threshold" and the "normal power generation restriction threshold" shown in FIG. 2A is a range of charge amount (an SOC range) that allows for charging based on electric power generated by the engine 1 in normal mode. In other words, the SOC that allows for charging with electric power generated by the engine 1 is defined by the "normal power generation restriction threshold" as an upper limit and the "normal power generation start threshold" as a lower limit.

It is to be noted that in FIG. 2A, change in the SOC in the SOC range is depicted in a linear fashion; however, it does not necessarily have to be controlled to show linear behavior. As long as the SOC range in normal mode is defined by the "normal power generation restriction threshold" and the "normal power generation start threshold", the behavior of the SOC between them may be set accordingly. Furthermore, in the first place, regenerative electric power is charged into the battery 4 according to the running state in principle; therefore, it is often the case that the SOC shows non-linear displacement behavior according to regenerative electric power. Moreover, in the present embodiment, as described above, 90% is set as an upper limit of the SOC range; however, in consideration of the addition of an amount of charge based on regenerative electric power (a buffer for regenerative electric power), in some cases, electric power generation of the engine 1 may be controlled so that the SOC of the battery 4 stays at about 60%.

It is to be noted that in normal mode, an upper limit of the amount of charging based on regenerative electric power is also set to the same value as the above-described "normal power generation restriction threshold (90%)". Therefore, in a case where the SOC exceeds 90% in the normal mode, and regenerative electric power is generated by the drive motor 6, without charging it into the battery 4, the regenerative electric power is consumed, for example, by driving the electric generator 2 and performing motoring of the engine 1. However, the upper limit of the amount of charging based on regenerative electric power does not necessarily have to be the same value as the "normal power generation restriction threshold"; for example, a value slightly greater than the "normal power generation restriction threshold" may be separately set as the upper limit of the amount of charging based on regenerative electric power. It is to be noted that in normal mode in the present embodiment, a regenerative braking force equivalent to an engine brake in a general engine-driven vehicle is produced.

Silent mode is a mode that allows for running with noise reduced further than in normal mode. In silent mode, charging of the battery 4 based on electric power generated by the electric generator 2 is not performed. Therefore, while in silent mode, the vehicle does not perform driving of the engine 1 for the purpose of generating electric power, and is caused to run silently by the drive motor 6 using only discharging electric power of the battery 4 as a power source. That is, the driver can intentionally cause the vehicle to run silently by selecting silent mode.

However, in the present embodiment, in a case where while the vehicle is in silent mode, there arises a need to drive the engine 1, silent mode is canceled despite the driver's intention, and the engine 1 is driven. In a case where driving of the engine 1 is demanded while the vehicle is in silent mode, the demand is mainly from the aspect of safety or environmental protection, and includes, for example, a demand for warm-up of a catalyst in order to ensure the exhaust performance of the engine 1, and is made, for example, in a case where it is required to generate negative pressure for a brake pedal assist.

Charge mode is a mode configured to perform charging of the battery 4 more actively than when in normal mode. When charge mode is selected, the vehicle controller 10 preferentially performs electric power generation by the engine 1 so that the amount of charge of the battery 4 reaches a preset reference value. That is, in normal mode, power generation is performed according to the running state; whereas, in charge mode, electric power generation by the engine 1 is performed according to a mode operation made by the driver or the occupant. That is, the driver can intentionally increase the SOC of the battery 4 by selecting charge mode, thereby causing electric power generation by the engine 1 to be performed. Thus, for example, by selecting charge mode before selecting silent mode, the SOC as of the start of silent mode selected subsequently to charge mode can be increased, and therefore a running distance in silent mode can be improved.

Figure 2B:
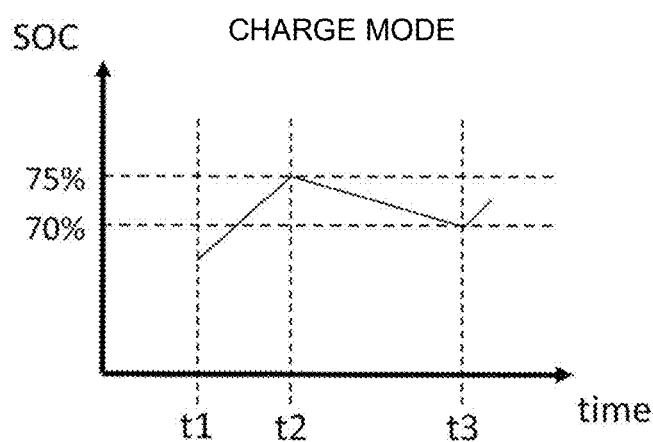
FIG. 2B is a diagram to explain an SOC range in charge mode.

FIG. 2B is a diagram to explain control of the amount of charge of the battery 4 (SOC control) in charge mode. The horizontal axis indicates time, and the vertical axis indicates the SOC [%] of the battery 4. A solid line in the diagram represents the SOC of the battery 4.

At time t1, the vehicle controller 10 detects that charge mode has been selected through the mode SW 15, and starts electric power generation by the engine 1. That is, in charge mode, by the driver having selected charge mode, electric power generation by the engine 1 is forcibly performed, and charging of the battery 4 is started.

At time t2, the vehicle controller 10 detects that the SOC of the battery 4 has reached a predetermined rate, and shuts down the electric power generation by the engine 1. It is to be noted that the predetermined rate of the SOC for comparison here is hereinafter referred to as a "charge-mode power generation restriction threshold". The charge-mode power generation restriction threshold is set to a value lower than the above-described normal power generation restriction threshold. The charge-mode power generation restriction threshold in the present embodiment is, for example, 75%.

There is described the reason the "charge-mode power generation restriction threshold" is defined like this. Charge mode is, as described above, a mode in which the SOC of the battery 4 can be intentionally increased by actively performing electric power generation by the engine 1 according to the driver's demand. As an example of a situation in which such charge mode is selected, it is assumed to be before selecting silent mode as described above.

Here, as described above, there are cases such as a case where the amount of battery charge reaches full charge level and a case where power generation is restricted when the amount of charge of the battery 4 becomes the predetermined rate. For example, in the present embodiment, an upper limit of threshold for prohibition of charging of the battery 4 is defined in terms of the protection of the battery, and, when the SOC of the battery 4 exceeds the upper limit of threshold, the state of the battery 4 plunges into the charging prohibition stage in which at least electric power generation by the engine 1 is prohibited. In the above description of normal mode, in the present embodiment, this threshold for plunging into the charging prohibition stage is described to be 90%; the threshold is also applied to charge mode. That is, in the present embodiment, in terms of the protection of the battery, the upper limit of threshold (here, 90%; hereinafter referred to as a "charging restriction upper limit") for prohibition of charging of the battery 4 is set regardless of selected mode.

Meanwhile, the engine 1 loaded onto the vehicle needs to warm up an exhaust catalyst of the engine 1 to ensure the exhaust (exhaust gas) performance with a predetermined level or higher. Furthermore, the exhaust catalyst is configured to be warmed up according to the motor rotation speed and torque of the engine 1 by the engine 1 being driven. Therefore, if the temperature of the exhaust catalyst decreases to a temperature at which the exhaust performance with the predetermined level or higher cannot be ensured, it may require warm-up of the catalyst that causes the engine 1 to be driven to warm up the exhaust catalyst.

Here, if the "charge-mode power generation restriction threshold" in charge mode in which power generation is actively performed is set to the same value as the "charging restriction upper limit" as with in normal mode, the SOC exceeds the "charging restriction upper limit" while the vehicle is in charge mode, and the state of the battery 4 is likely to enter the charging prohibition stage. For example, in a case where the SOC is forcibly increased to 89.9% when the vehicle is in charge mode, in that state, regenerative electric power is generated, and thereby the SOC easily exceeds the charging restriction upper limit. As a result, the state of the battery 4 plunges into the charging prohibition stage while the vehicle is in charge mode, and power generation is restricted for a while, and therefore, immediately after the vehicle starts running in silent mode subsequently, it may require warm-up of the catalyst. Furthermore, depending on the length of the charging prohibition stage, the SOC of the battery 4 is decreased by electric power being consumed during the charging prohibition stage, and the SOC as of the start of running in subsequent silent mode may become lower.

That is, if the "charge-mode power generation restriction threshold" is set as with the "normal power generation restriction threshold", this increases the possibility that the engine 1 is driven according to a demand for warm-up of the catalyst while the vehicle is running in silent mode, or causes the SOC to become lower, and thus it is likely that the driver's demand to cause the vehicle to run silently cannot be met.

Accordingly, the "charge-mode power generation restriction threshold" in the present embodiment is set to a value lower than the above-described "normal power generation restriction threshold". Thus, a buffer for regenerative electric power can be set in the upper limit (90% in this example) set in terms of the protection of the battery, which makes it possible to prevent the state of the battery 4 from entering the charging prohibition stage while the vehicle is in charge mode. Furthermore, the buffer for regenerative electric power is set within an SOC range achieved while the vehicle is in charge mode, and therefore, it is possible to avoid motoring of the engine for ensuring of deceleration occurring while the vehicle is in subsequent silent mode.

It is to be noted that the amount of regenerative electric power changes according to the vehicle speed, and therefore, the size of the buffer for regenerative electric power may be increased or reduced according to the vehicle speed. Specifically, the amount of regenerative electric power tends to increase with increase in the vehicle speed, and thus the "charge-mode power generation restriction threshold" is set to a lower value as the vehicle speed becomes higher.

Furthermore, the engine 1 in the present embodiment is configured to select a more efficient operating point (working point) according to the SOC, etc. of the battery 4. Therefore, for example, at the time of warm-up of the catalyst, the engine 1 is preferably controlled to be driven at an operating point more suitable for warm-up of the catalyst. That is, the "charge-mode power generation restriction threshold" in the present embodiment is set to a value lower than the "normal power generation restriction threshold", and thus warm-up of the catalyst by the engine 1 can be performed at a more efficient operating point. This makes it possible for the engine 1 to generate electric power at an operating point suitable for catalyst temperature rising, and thus it is possible to suppress the frequency of warm-up of the catalyst. However, 75% that is a value of the charge-mode power generation restriction threshold given here is an example, and may be suitably adjusted according to characteristics of the engine 1, the battery 4, etc.

To return to FIG. 2B, we continue the explanation. After the electric power generation by the engine 1 has been restricted at time t2, the SOC of the battery 4 is gradually decreased, for example, by causing the drive motor 6 to drive. Then, when the SOC has fallen below a "charge-mode power generation start threshold", the vehicle controller 10 starts electric power generation by the engine 1. The "charge-mode power generation start threshold" is a value that defines a lower limit of the SOC range in charge mode, and is set to a value higher than the "normal power generation start threshold". The "charge-mode power generation start threshold" in the present embodiment is 70% as an example. It is to be noted that the "charge-mode power generation start threshold" can be said to be a value that defines the maximum hysteresis error with respect to the "charge-mode power generation restriction threshold".

That is, in charge mode in the present embodiment, once the SOC of the battery 4 has exceeded the "charge-mode power generation start threshold", the vehicle controller 10 controls the electric power generation by the engine 1 so that the SOC does not fall below the "charge-mode power generation start threshold". Thus, while charge mode is the selected mode, the SOC of the battery 4 can be maintained at high level (here, 70% or more), and therefore a running distance in silent mode selected subsequently can be improved regardless of timing to select charge mode (even if it is premature).

The above-described SOC control in charge mode is described with reference to FIG. 3.

Figure 3:
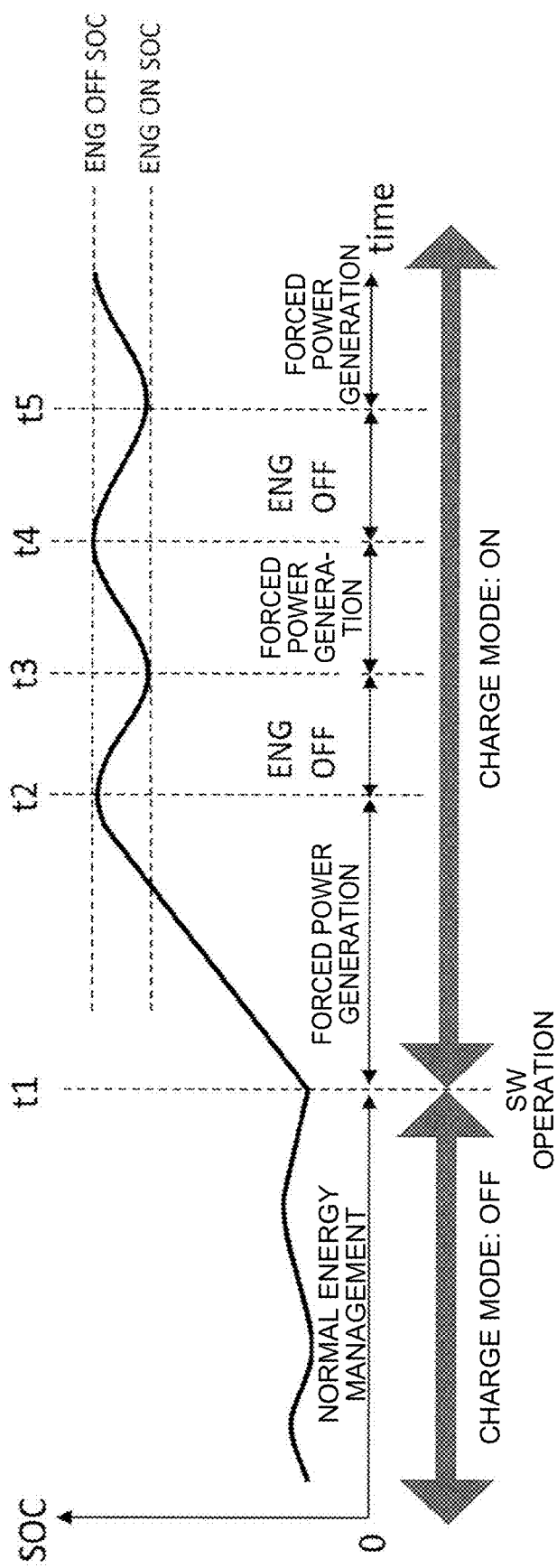
FIG. 3 is a time chart showing the behavior in SOC control according to the embodiment.

FIG. 3 is a time chart showing the behavior of the SOC when in charge mode. The horizontal axis indicates time, and the vertical axis indicates the SOC [%] of the battery 4. A solid line in the chart represents the SOC of the battery 4. Furthermore, t1 to t3 in the chart correspond to t1 to t3 in FIG. 2B.

At time t1, the vehicle controller 10 detects that charge mode has been selected through the mode SW 15, forcibly starts electric power generation by the engine 1. In principle, the electric power generation by the engine 1 started at time t1 is continued until the SOC reaches the "charge-mode power generation restriction threshold" (time t2). However, although not shown in the chart, even when the vehicle is in charge mode, in some cases, the electric power generation of the engine 1 may be exceptionally shut down upon request particularly for the sake of safety. For example, in a case where it is required to generate negative pressure for a brake pedal assist, to generate negative pressure in an engine intake passage, there may be performed motoring control in which the electric generator 2 is driven by battery power to start the engine 1 even when the vehicle is in charge mode.

At time t2, the vehicle controller 10 detects that the SOC of the battery 4 has reached the "charge-mode power generation restriction threshold", and shuts down the electric power generation by the engine 1. After the electric power generation by the engine 1 has been shut down, electric power of the battery 4 is consumed, for example, by causing the drive motor 6 to be driven and auxiliary equipment (not shown) to operate, and the SOC gradually decreases.

At time t3, the vehicle controller 10 detects that the SOC of the battery 4 has fallen below the "charge-mode power generation restriction threshold", and starts electric power generation by the engine 1. In principle, the electric power generation by the engine 1 started at time t3 is continued until the SOC reaches the "charge-mode power generation restriction threshold" (time t4).

At time t4, as with at time t2, it is detected that the SOC of the battery 4 has reached the "charge-mode power generation restriction threshold", and prohibits the electric power generation by the engine 1. Furthermore, at time t5, as with at time t3, electric power generation by the engine 1 started. Then, from time t5 onward, as long as charge mode is the selected mode, as with at times t2 to t5, the SOC of the battery 4 is controlled so as to be maintained within the SOC range.

In this way, in charge mode in the present embodiment, the vehicle controller 10 starts electric power generation by the engine 1 according to a mode operation to select charge mode, thereby forcibly increasing the SOC of the battery 4 until it reaches the "charge-mode power generation restriction threshold". Then, after the SOC of the battery 4 has reached the "charge-mode power generation restriction threshold", the electric power generation by the engine 1 is controlled so that the SOC of the battery 4 falls within the SOC range defined by the "charge-mode power generation restriction threshold" and the "charge-mode power generation start threshold".

Thus, the SOC while the vehicle is in charge mode can be maintained at high level (here, 70% or more), and therefore, a running distance of the vehicle when running in subsequent silent mode can be improved regardless of timing to select charge mode.

Furthermore, by restricting the SOC while the vehicle is in charge mode to be a value equal to or lower than the "charge-mode power generation restriction threshold" set to a value lower than the "charging restriction upper limit", a buffer for regenerative electric power can be reserved; therefore, it is possible to prevent power generation from being prohibited for a given period of time due to regenerative electric power being charged into the battery 4, while increasing the amount of charge of the battery 4 according to the driver's demand for battery charging. As a result, it is possible to reduce a possibility that the engine 1 may need to be driven according to a demand for warm-up of the catalyst when the vehicle starts running in silent mode after charge mode is off.

Moreover, in the present embodiment, the upper limit of the SOC range of the battery 4 is set taking an efficient operating point of the engine 1 into account; therefore, even in a case where the engine 1 is driven according to, for example, a demand for warm-up of the catalyst after charge mode, the engine 1 can be driven at a predetermined more efficient operating point.

As described above, the device for controlling the hybrid vehicle according to the embodiment is a device for controlling a hybrid vehicle including the electric generator 2 capable of charging the battery 4 with power of the engine 1 and supplying the drive motor 6 as a drive source with driving electric power from the battery 4. This device for controlling the hybrid vehicle includes: a running-mode selection switch (the mode SW 15) through which normal mode or charge mode can be selected; the battery charge amount detecting unit (the vehicle controller 10) that detects or estimates an amount of charge (an SOC) of the battery 4; and the electric power generation control unit (the vehicle controller 10) that controls electric power generation by the engine 1 according to a running state. When normal mode is selected, the electric power generation control unit (the vehicle controller 10) implements the electric power generation by the engine to charge the battery 4 according to a running state within a preset range of charge amount that allows for charging of the battery 4. Furthermore, when charge mode is selected, the electric power generation control unit implements the electric power generation by the engine 1 even in a running state where the power generation by the engine is not implemented in normal mode, and sets an upper limit of the range of charge amount in charge mode (a charge-mode power generation restriction threshold) to be lower than an upper limit of the range of charge amount in normal mode (a normal power generation restriction threshold).

This makes it possible to restrict the SOC in charge mode to a value equal to or lower than the upper limit (the charge-mode power generation restriction threshold) set to a value lower than the charging restriction upper limit (an upper limit of the SOC range in normal mode), and therefore, it is possible to avoid the state of the battery 4 from plunging into the charging prohibition stage and the power generation from being restricted, while increasing the amount of charge of the battery 4 according to the driver's demand for battery charging. As a result, while the vehicle is running in silent mode, a need to drive the engine is prevented from arising, and motoring of the engine for ensuring of deceleration is prevented from occurring; therefore, it is possible to reduce a possibility to provide a scene in which the driver's demand to cause the vehicle to run silently cannot be met despite the increase in the amount of battery charge in advance based on the driver's intention.

Furthermore, according to the device for controlling the hybrid vehicle according to the embodiment, in a case where the amount of charge of the battery 4 is charged to an amount equal to or larger than the upper limit within the range of charge amount in normal mode, the electric power generation control unit (the vehicle controller 10) prohibits charging of the battery 4 for a predetermined time (the charging prohibition stage). This makes it possible to prevent deterioration and the like of the battery 4 due to overcharge.

Moreover, according to the device for controlling the hybrid vehicle, when regenerative electric power of the drive motor 6 is generated, the electric power generation control unit (the vehicle controller 10) cause the electric generator 2 to perform motoring of the engine 1 with the regenerative electric power. This makes it possible to prevent, for example, the amount of charge of the battery 4 from exceeding the upper limit within the range of charge amount due to regenerative electric power generated according to the running state.

Furthermore, the device for controlling the hybrid vehicle according to the embodiment sets a lower limit (the charge-mode power generation start threshold) of the range of charge amount in charge mode (the range of charge amount) when the vehicle is in charge mode to be higher than a lower limit (the normal power generation start threshold) of the range of charge amount in normal mode. This makes it possible to maintain the SOC in charge mode at a higher level than when in normal mode. As a result, for example, in a case where silent mode is selected after charge mode, it is possible to improve the drivable distance in silent mode.

Moreover, the device for controlling the hybrid vehicle according to the embodiment sets the upper limit (the charge-mode power generation restriction threshold) of the range of charge amount in charge mode to be lower as the vehicle speed becomes higher. This makes it possible to achieve more proper SOC control taking into account the amount of regenerative electric power that changes according to the vehicle speed.

The embodiment of the present invention has been described above; however, the above-described embodiment represents only some of application examples of the present invention, and is not intended to limit the technical scope of the present invention to the specific configuration of the above-described embodiment. For example, each value to be an indicator or an object to be controlled in the power generation control is not limited to that is described above.

For example, the figure of each threshold provided in the above description is merely an example, and is not limited to the provided numerical value. Each numerical value provided as an example may be adjusted accordingly as long as it meets its corresponding condition described in the specification, for example, such as a condition that the charge-mode power generation restriction threshold is set to be lower than the normal power generation restriction threshold.

The invention claimed is:

1. A method for controlling a hybrid vehicle including a battery, an engine, and a motor as a drive source, wherein the battery is charged with an electric power generated by the engine and a regenerative electric power of the motor, and the vehicle has multiple running modes that can be selected through a mode operation, the running modes including:
   a normal mode configured to generate electric power by the engine to charge the battery according to a running state,
   a charge mode configured to generate the electric power by the engine to charge that battery more actively than in the normal mode, and
   a silent mode configured to not generate the electric power by the engine to charge the battery, the method comprising:
   restricting electric power generation by the engine to charge the battery when an amount of charge of the battery reaches a generation restriction upper limit that is set to be equal to or lower than a charging restriction upper limit of the battery, wherein:
   the generation restriction upper limit is set differently according to the running modes,
   the generation restriction upper limit in the charge mode is set to be lower than the generation restriction upper limit in the normal mode, and
   the generation restriction upper limit of the range of charge amount in the charge mode is set to be lower as a vehicle speed becomes higher.

2. The method for controlling the hybrid vehicle according to claim 1, further comprising setting a predetermined lower limit of the range of the amount of charge in the charge mode to be higher than the predetermined lower limit of the amount of charge in the normal mode, wherein the predetermined lower limit is a value at which the charging of the battery with the electric power generated by the engine is started.

3. A device for controlling a hybrid vehicle including a battery, an, and a motor as a drive source, wherein the battery is charged with an electric power generated by the engine and a regenerative electric power of the motor, the device comprising:
   a running-mode selection switch through which a normal mode, a charge mode, or a silent mode is able to be selected;
   a battery charge amount detecting unit that detects or estimates a charge amount of the battery; and
   an electric power generation control unit that controls electric power generation by the engine according to a running state, wherein the electric power generation control unit is configured to:
      when the normal mode is selected, control the engine to generate the electric power to charge the battery according to the running state,
      when the charge mode is selected, control the engine to generate the electric power to charge the battery more actively than in the normal mode,
      when the silent mode is selected, control the engine not to generate the electric power, and
      restrict electric power generation by the engine to charge the battery when the amount of charge of the battery becomes a generation restriction upper limit that is set to be equal to or lower than a charging restriction upper limit of the battery, wherein
         the generation restriction upper limit in the charge mode is set to be lower than the generation restriction upper limit in the normal mode, and
         the generation restriction upper limit in the charge mode is set to be lower as a vehicle speed becomes higher.

4. The device for controlling the hybrid vehicle according to claim 3, wherein in a case where the battery is charged to an amount equal to or larger than the generation restriction upper limit in the normal mode, the electric power generation control unit prohibits charging of the battery for a predetermined time.

5. The device for controlling the hybrid vehicle according to claim 4, wherein when the regenerative electric power of the motor is generated in a state where the battery is charged to the amount equal to or larger than the generation restriction upper limit in the normal mode, the electric power generation control unit cause the electric generator to perform motoring of the engine with the regenerative electric power, wherein, in the motoring, the engine is powered to run and rotate by using power of the electric generator to consume the regenerative electric power.

6. The device for controlling the hybrid vehicle according to claim 3, wherein the electric power generation control unit sets a predetermined lower limit of the charge amount in the charge mode to be higher than the predetermined lower limit of the charge amount in the normal mode, wherein the predetermined lower limit is a value at which the charging of the battery with the electric power generated by the engine is started.

7. The method for controlling a hybrid vehicle according to claim 1, wherein the engine is configured to generate the electric power by driving an electric generator, and when the regenerative electric power of the motor is generated in a state where the battery is charged with the amount equal to or larger than the generation restriction upper limit in the normal mode, the method further comprises causing the electric generator to perform motoring of the engine with the regenerative electric power, wherein, in the motoring, the engine is powered to run and rotate by using power of the electric generator to consume the regenerative electric power.

8. The method of claim 1, wherein the generation restriction upper limit is set to be lower than a charging restriction upper limit of the battery.

9. The device of claim 3, wherein the generation restriction upper limit is set to be lower than a charging restriction upper limit of the battery.

* * * * *